(12) United States Patent
Lloyd

(10) Patent No.: US 11,785,932 B2
(45) Date of Patent: Oct. 17, 2023

(54) FISHING ALARM SYSTEM

(71) Applicant: Ronnie G. Lloyd, LaFollette, TN (US)

(72) Inventor: Ronnie G. Lloyd, LaFollette, TN (US)

( * ) Notice: Subject to any disclaimer, the term of this patent is extended or adjusted under 35 U.S.C. 154(b) by 124 days.

(21) Appl. No.: 17/300,249

(22) Filed: Apr. 28, 2021

(65) Prior Publication Data

US 2022/0346362 A1 Nov. 3, 2022

(51) Int. Cl.
*A01K 97/12* (2006.01)

(52) U.S. Cl.
CPC .................. *A01K 97/125* (2013.01)

(58) Field of Classification Search
CPC ....... A01K 97/125; A01K 97/12; A01K 97/01
See application file for complete search history.

(56) References Cited

U.S. PATENT DOCUMENTS

| | | | | | |
|---|---|---|---|---|---|
| 963,654 | A | * | 7/1910 | Schindler | A01K 97/125 43/17 |
| 1,181,668 | A | * | 5/1916 | Johnson | A01K 97/125 43/17 |
| 2,556,628 | A | * | 6/1951 | Nisle, Sr. | A01K 97/125 43/17 |
| 2,619,559 | A | * | 11/1952 | Schenkel | A01K 97/125 200/61.18 |
| 2,858,635 | A | * | 11/1958 | Haeusler | A01K 97/125 43/17 |
| 3,959,911 | A | * | 6/1976 | Puckett | A01K 97/125 43/17 |
| 4,794,719 | A | * | 1/1989 | Rabino | A01K 97/125 43/17 |
| 5,261,180 | A | * | 11/1993 | Foster | A01K 97/125 43/17 |
| 5,943,808 | A | * | 8/1999 | Bryant | A01K 97/125 43/17 |
| 6,101,757 | A | * | 8/2000 | Draghici | A01K 97/125 43/17 |
| 6,125,571 | A | * | 10/2000 | Sigwald | A01K 97/125 43/16 |
| 7,624,531 | B2 | | 12/2009 | Kirby | |

\* cited by examiner

*Primary Examiner* — Peter M Poon
*Assistant Examiner* — Shada Mohamed Alghailani
(74) *Attorney, Agent, or Firm* — Michael E. McKee

(57) ABSTRACT

A fishing alarm system for use with a fishing line which moves when disturbed by a fish utilizes an alarm device and two electrical contacts which are moveable toward and away from one another between an initial condition at which a circuit between the alarm device and a power source is made and a spaced-apart condition at which a circuit between the alarm device and the power source is broken. In addition, the contacts are biased from the spaced-apart condition toward the initial condition so that by inserting a section of the fishing line between the two contacts, the contacts are moved away from one another and held at the spaced-apart condition by the fishing line section positioned between the pair of electrical contacts. Upon removal of the fishing line from between the contacts, the contacts are permitted to return toward the initial condition at which a circuit is made between the alarm device and the power source.

4 Claims, 3 Drawing Sheets

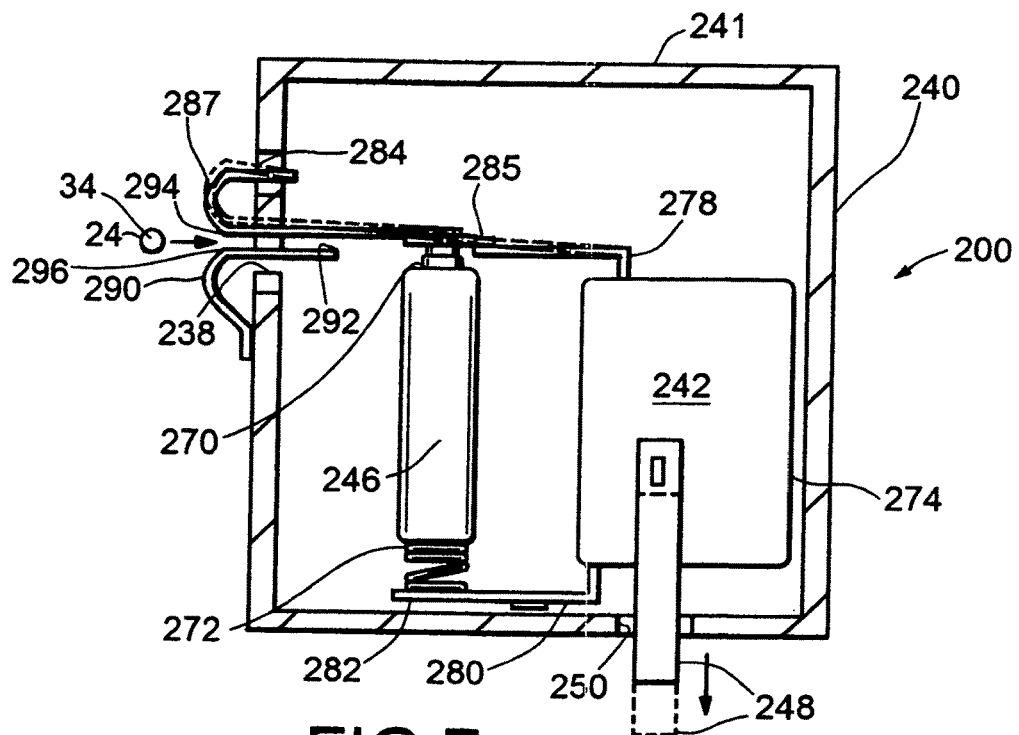
FIG.7
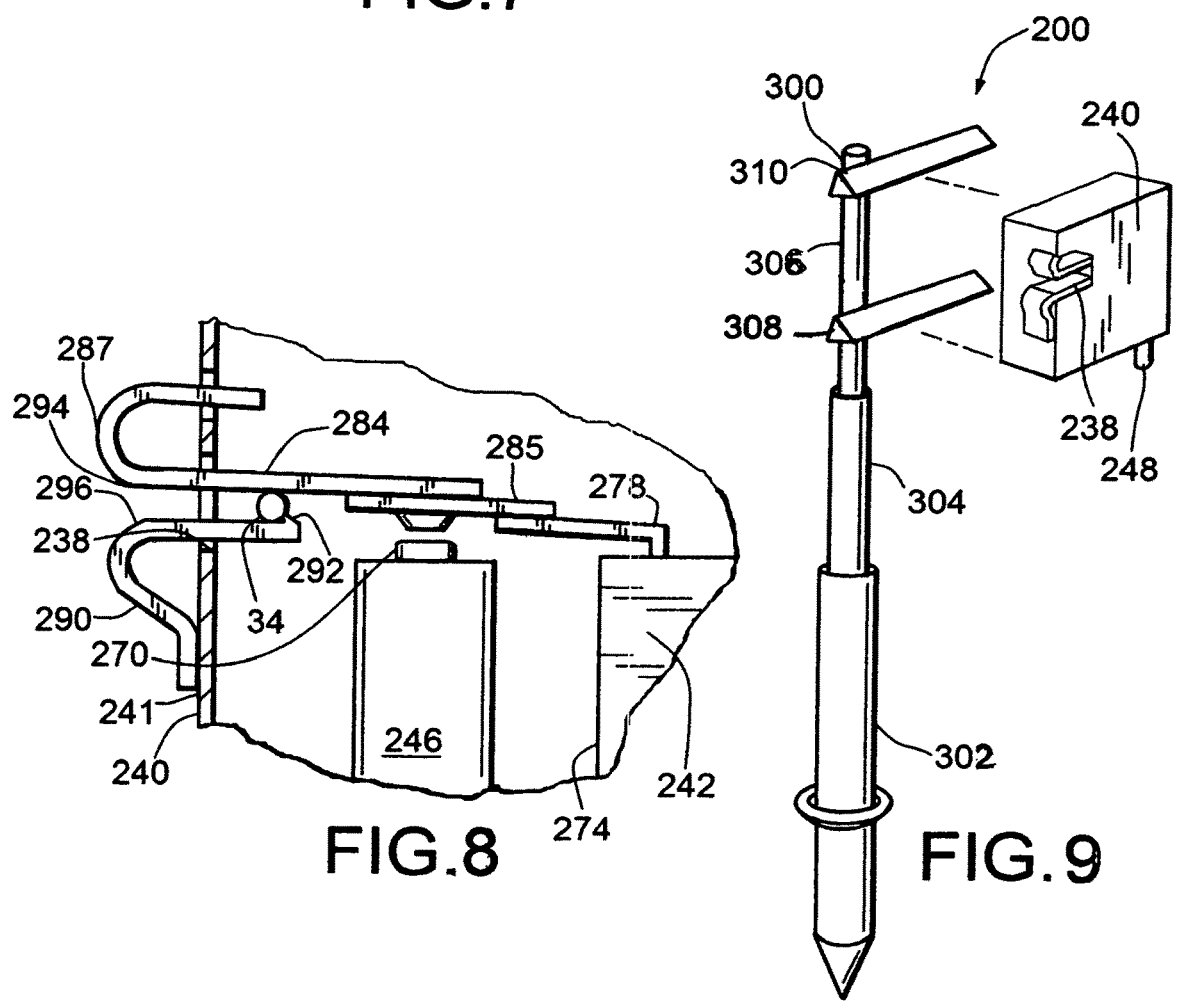
FIG.8
FIG.9

FISHING ALARM SYSTEM

BACKGROUND OF THE INVENTION

This invention relates generally to fishing accessories and relates, more particularly, to means and methods for alerting a fisherman that a fish is biting his fishing line or, more specifically, a hook which is attached to his line.

The concept of providing an alarm system for alerting a fisherman that a fish is biting his fishing line is known. One such alarm system, shown and described in U.S. Pat. No. 7,624,531, utilizes the movement of a fishing line (indicative that a fish is biting or pulling upon the fishing line) to physically flip a switch which, in turn, initiates the activation of a suitable alarm.

It would be desirable to provide a new and improved fishing alarm system of the aforedescribed class.

Accordingly, it is an object of the present invention to provide a new and improved fishing alarm system which utilizes the disturbance, or movement, of the fisherman's fishing line when a fish bites upon a hook which is attached to an end of the line.

Another object of the present invention is to provide such a fishing alarm system which is relatively compact in construction and easy to use.

Still another object of the present invention is to provide such a fishing alarm system which is uncomplicated in structure, yet effective in operation.

SUMMARY OF THE INVENTION

This invention resides in a fishing alarm system for use with a fishing line which moves when disturbed by the biting or striking of the fishing line by a fish.

The fishing alarm system includes an electronic alarm device adapted to emit an audible sound when an electrical current is passed therethrough and also includes a pair of electrical contacts which are moveable toward and away from one another between an initial condition at which an electrical circuit is made between the electrical alarm device and a power source and a spaced-apart condition at which an electrical circuit between the electronic alarm device and the power source is broken. In addition, the pair of electrical contacts are biased from the spaced-apart condition toward the initial condition so that by inserting a section of the fishing line between the pair of electrical contacts, the contacts are moved away from one another to the spaced-apart condition and held thereat by the section of fishing line positioned between the pair of electrical contacts and so that upon removal of the fishing line from between the pair of electrical contacts, as would occur when the fishing line is disturbed by the biting or striking of the fishing line by a fish, the pair of contacts are permitted to return toward the initial condition at which the electrical circuit is made between the electronic alarm device and the power source.

BRIEF DESCRIPTION OF THE DRAWINGS

FIG. 7 is a longitudinal cross section view of still another embodiment of the fishing alarm system within which features of the present invention are incorporated.

FIG. 8 is a fragment of the FIG. 7 embodiment as shown in FIG. 7, but drawn to a slightly larger scale.

FIG. 9 is a perspective view of the embodiment of FIG. 7 shown removed from a telescoping rod assembly to which the FIG. 7 embodiment can be releasably secured for use.

DETAILED DESCRIPTION OF AN ILLUSTRATIVE EMBODIMENT

Figure 1:
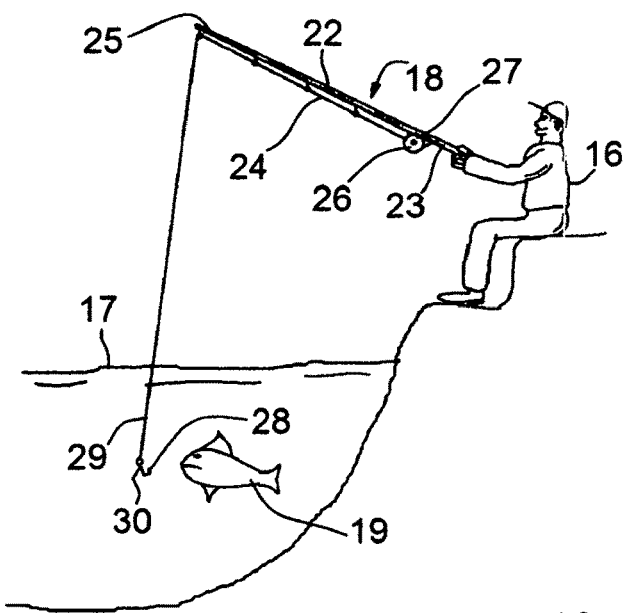
FIG. 1 is a perspective view of an exemplary environment within which an embodiment of a fishing alarm system embodying features of the present invention can be utilized.

Turning now to the drawings in greater detail, there is illustrated in FIG. 1 an exemplary environment, generally indicated 18, within which an embodiment (described herein) of the present invention can be utilized. More specifically, the FIG. 1 environment depicts a fisherman 16 who is seated along the bank of a waterway 17 and holds a fishing pole 22 in an attempt to catch a fish 19 swimming in the waterway 17. The fishing pole 22 depicted in FIG. 1 includes a handle end 23 and an opposite tip end 25, and a fishing line 24 extends along the length of the pole 22 and has one end, generally indicated 27, which is wound about a reel 26 mounted adjacent the handle end 23 of the pole 22 and has another, or free, end, generally indicated 29, which is tied to a hook 28. The hook 28, in turn, is baited with an appropriate bait 30. If desired, the hook 28 could be incorporated within a fishing lure (not shown) which can be tied upon the free end 29 of the fishing line 24.

Figure 4:
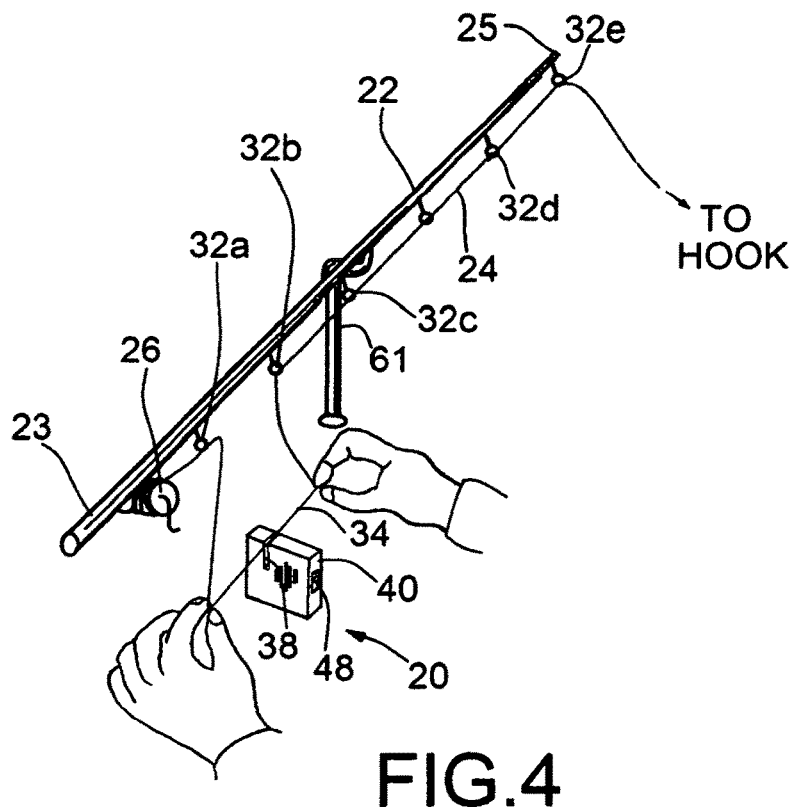
FIG. 4 is a perspective view of the FIG. 2 embodiment shown being readied for use alongside a fishing pole.

In accordance with a characteristic common to fishing poles of the class depicted in FIG. 1, the fishing pole 22 includes a series of eyelets 32a-32e FIG. 4) which are positioned at regularly-spaced intervals along the length of the pole 22. As will be explained in greater detail herein, it is a section, indicated 34, of the fishing line 24 which extends between an adjacent pair of eyelets 32a and 32b and which is fastened to the alarm system embodiment 20 when the fishing pole 22 is used with the embodiment 20.

When fishing with a pole 22 and fishing line 24 as depicted in the FIG. 1 environment 18, the line 24 shifts in position or, more specifically, is sharply pulled or jerked taut when the hook 28 is struck or disturbed by the fish 19. That is to say that when the fish 19 strikes at the fishing line 24 by way of the hook 28, the line 24 is commonly jerked lengthwise. This lengthwise jerking of the line 24 would ordinarily indicate to the fisherman 16 that the baited hook 28 is being struck by the fish 19, but if the pole 22 is unattended by the fisherman 16, the striking of the line 24 by the fish 19 may occur unnoticed. However, by utilizing the fishing alarm system 20 of the present invention in conjunction with the fishing pole 22, the striking of the fishing line 24 by the fish 19 will not go unnoticed, even if the fishing pole 22 is left unattended.

Figure 2:
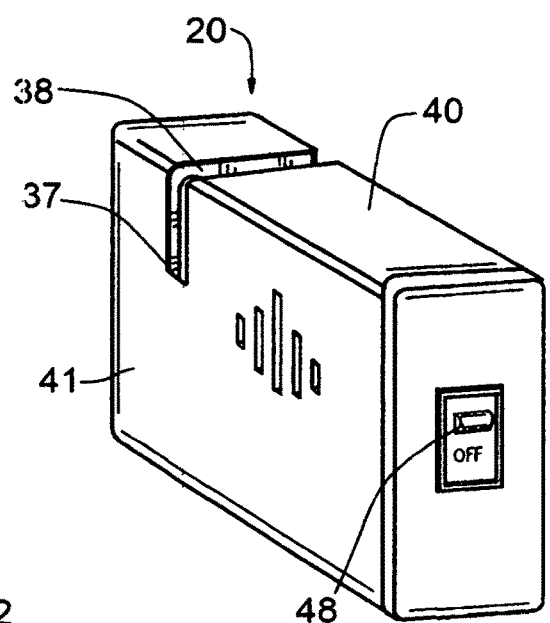
FIG. 2 is a view of a perspective view of an embodiment of a fishing alarm system within which features of the present invention are incorporated.
Figure 3:
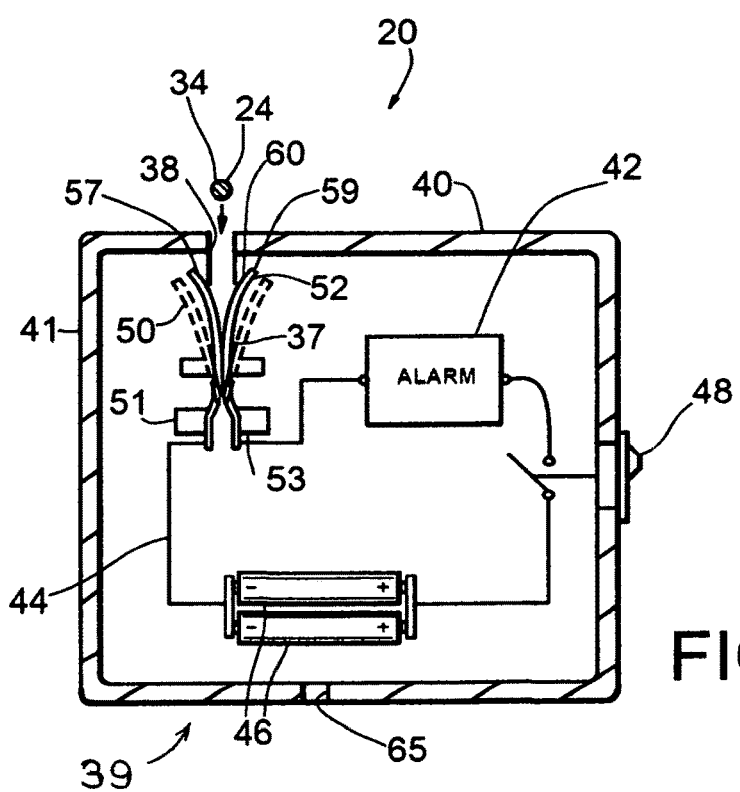
FIG. 3 is a longitudinal cross section of the FIG. 2 embodiment and a diagram of the electrical components thereof.

With reference to FIGS. 2-4, there is shown an embodiment, generally indicated 20, of a fishing alarm system within which features of the present invention are embodied. Briefly, the embodiment 20 includes a substantially rectangular-shaped casing 40 having a hollow interior within which various working components, described herein, of the embodiment 20 are housed. In addition, the casing 40 includes an exterior wall, indicated 41, within which a preformed slot 38 is defined. As will be apparent herein, the slot 38 is adapted to accept the section 34 of fishing line 24 directed sidewise therein for fastening the fishing line section 34 to the embodiment 20 and thereby readying the system embodiment 20 for use. The working components of the embodiment 20 include an electronic alarm-emitting device 42 (FIG. 3) which is adapted to emit an audible sound, or alarm, when the device 42 is electrically activated and an attending electrical control circuit 44 for conducting power to the alarm device 42 from a power source when the fishing line section 34 becomes removed, or unfastened, from the embodiment 20.

As best shown in FIG. 3, the electrical circuit 44 includes a power source 39 (FIG. 3) in the form of a replaceable pair of batteries 46 which are mounted within the casing 40 and a user-accessible, two-position ON/OFF switch 48 which is wired into the circuit 44 (yet accessible external of the casing 40) enabling the user to save battery power when the embodiment 20 is not in use.

It is also a feature of the embodiment 20 that its control circuit 44 includes a pair of electrical contacts 50 and 52 which are each fastened to bosses 51, 53 formed within the casing 40 yet are adapted to be moved toward (and into engagement with) one another and away from (and thus out of engagement with) one another. For example and as best shown in FIG. 3, the contacts 50 and 52 have free end portions, indicated 57 and 59, respectively, which are movable between an initial position, as shown in solid lines in FIG. 3, at which the contacts 50 and 52 are in engagement with one another and a spaced-apart position, as shown in phantom in FIG. 3, at which the contacts 50 and 52 are out of engagement with one another. Moreover, the contacts 50 and 52 are each constructed out of a strip of conductive material and are inherently biased into engagement with one another. That is to say that the contacts 50 and 52 each possess a degree of spring-like resiliency so that when the contacts 50 and 52 are forcibly moved to the spaced-apart, or phantom-line positions of FIG. 3, and subsequently released, the contacts 50 and 52 are free to return to the initial, or solid-line, position of FIG. 3 at which the contacts 50 and 52 are in engagement with one another.

Assuming that the ON/OFF switch 48 has been set to its ON position and the pair of electrical contacts 50 and 52 are arranged in the FIG. 3 spaced-apart phantom-line positions—and thus out of engagement with one another, the electrical circuit 44 is broken so that no current is conducted to the alarm-emitting device 42. By comparison and when the contacts 50 and 52 are arranged in the FIG. 3 solid-line position—and thus in engagement with one another, the electrical circuit 44 is made so that current is permitted to be conducted to the alarm-emitting device 42.

With reference still to FIG. 3, the end portions 51 and 53 of the pair of contacts 50, 52 are shaped so as to taper away from one another as a path is traced therealong from the opposite end thereof. Together, the tips of the tapered end portions 51 and 53 form a funnel-shaped spacing 60 therebetween which opens out of the casing 40 by way of the slot 38 provided therein. This funnel-shaped spacing 60 serves as a guideway which helps to funnel, or guide, the fishing line section 34 into its desired position (i.e. of rest) between the contacts 50, 52 when readying the embodiment 20 for use.

The casing 40 can be constructed out of any of a number of suitable materials, such as a hard plastic, but other materials can be used. Meanwhile and if desired, the casing 40 can be molded in half sections which are subsequently joined, or glued together, after the circuit 44 has been assembled within the interior thereof.

To ready the embodiment 20 for use with a fishing pole 22 and with reference to FIG. 4, the fishing pole 22 is commonly anchored in a stationary position alongside the embodiment 20 either to the underlying ground or some other fixed supporting structure (e.g. a dock). The handle end 23 of the pole 22 can be anchored in place by, for example, positioning a stone atop the handle end 23 to press the handle end 23 downwardly against the ground, and if desired, the opposite, or tip end 25 of the pole 22 can be positioned in an elevated condition by means of a ground-engaging brace 61 (which could be provided by a forked stick) which extends between the underlying ground and a location along the pole 22 disposed intermediate the handle end 23 and the tip end 25.

Figure 5:
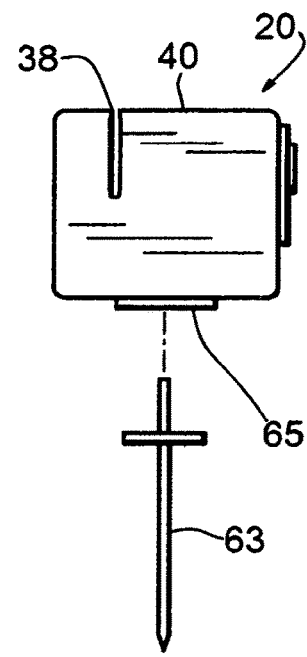
FIG. 5 is a side elevation view of one side of the casing of the FIG. 2 embodiment and a ground-engaging rod for supporting the FIG. 2 embodiment in an elevated condition above the ground.

Similarly and if desired, the embodiment 20 can be anchored in a stationary condition adjacent the pole 22 with stones (not shown) positioned on opposite sides of the casing 40. In the alternative and as shown in FIG. 5, a ground-engaging rod 63 can be used to hold the casing 40 of the embodiment 20 in an elevated (and stationary) condition adjacent the fishing pole 22. Within the FIG. 5 rod 63, the lower end thereof is adapted to be driven into the underlying ground while the upper end thereof is adapted to be accepted by a specially-formed (or molded) opening 65 (FIG. 3) which has been preformed in the bottom of the casing 40.

With the fishing pole 22 and the embodiment 20 thus anchored in stationary positions as aforedescribed, the section 34 of the fishing line 24 is fastened to the embodiment 20 by way of the slot 38 formed therein. To this end, the section 34 of the fishing line 24 (which section 34 extends between the eyelets 32a and 32b of the fishing pole 22) is grasped by both hands of the user, as best shown in FIG. 4, and the section 34 is manually moved sidewise, or sideways, (and downwardly as viewed in FIGS. 3 and 4) into the slot 38 so that the line 24 is directed into a desired position of rest between the contacts 50, 52 at which the contacts 50, 52 are moved to, and thereby maintained in, the FIG. 3 phantom-line positions at which the contacts 50, 52 are in the spaced-apart, or FIG. 3 phanton-line, condition. It follows that as long as the contacts 50, 52 are maintained in the spaced-apart condition, the circuit 44 remains broken so that no current is permitted to be conducted from the batteries 46 to the alarm-emitting device 42 of the embodiment 20.

Preferably, the lowermost edges, indicated 37 in FIG. 2, of the slot 38 is located in such a relationship with the contacts 50, 52 so that upon movement of the section 34 of the fishing line 24 downwardly to the lowermost edges 37 of the slot 38, the fishing line 24 is positioned between the contacts 50, 52 at a position of rest therebetween at which the contacts 50, 52 are disposed in the desired spaced-apart relationship for use of the embodiment 20. In other words, the lowermost edges 37 act as a stop which limits the (downward) movement of the fishing line 24 into the slot 38 to the desired position of rest between the contacts 50, 52. Preferably and after the fishing line section 34 is fastened to the embodiment 20 by of the contacts 50, 52 as aforedescribed, any slack in the fishing line 24 is taken up within the line so that the line 24 is in a relatively taut condition as it extends along the fishing pole 22. With the line 24 thereby arranged in a relatively taut condition, a striking of the fishing line 24 by a fish 19 effects a desired disturbance, or jerking, of the fishing line section 34 which extends between the fishing pole eyelets 32a and 32b.

As mentioned earlier, the disturbance of the baited hook 28 upon striking of the fishing line 24 by the fish 19 effects a shift in position, or a sudden jerk, of the fishing line 24. Since the fishing pole 22 and embodiment 20 are each anchored in a stationary position as aforedescribed and when the embodiment 20 is in a readied condition for use, this sudden disturbance of the fishing line 24 jerks, or suddenly moves, the section 34 of the fishing line 24 out from its position of rest between the contacts 50, 52 so that the contacts 50, 52 are permitted to return into engagement with one another (i.e. into the FIG. 3 solid-line position) and so that the circuit 44 is thereby made. It therefore follows that during use of the embodiment 20 with an unattended fishing pole 22, the removal of the fishing line 24 from its position of rest between the pair of contacts 50, 52, as would commonly occur when the fishing line 24 is disturbed by the biting or striking of the fishing line 24 by a fish 19, the pair of contacts 50, 52 are permitted to move into engagement with one another for making the electrical circuit 44 and thereby activating the electronic alarm device 42 which, in turn, emits an audible sound capable of being heard by the fisherman 16.

Figure 6:
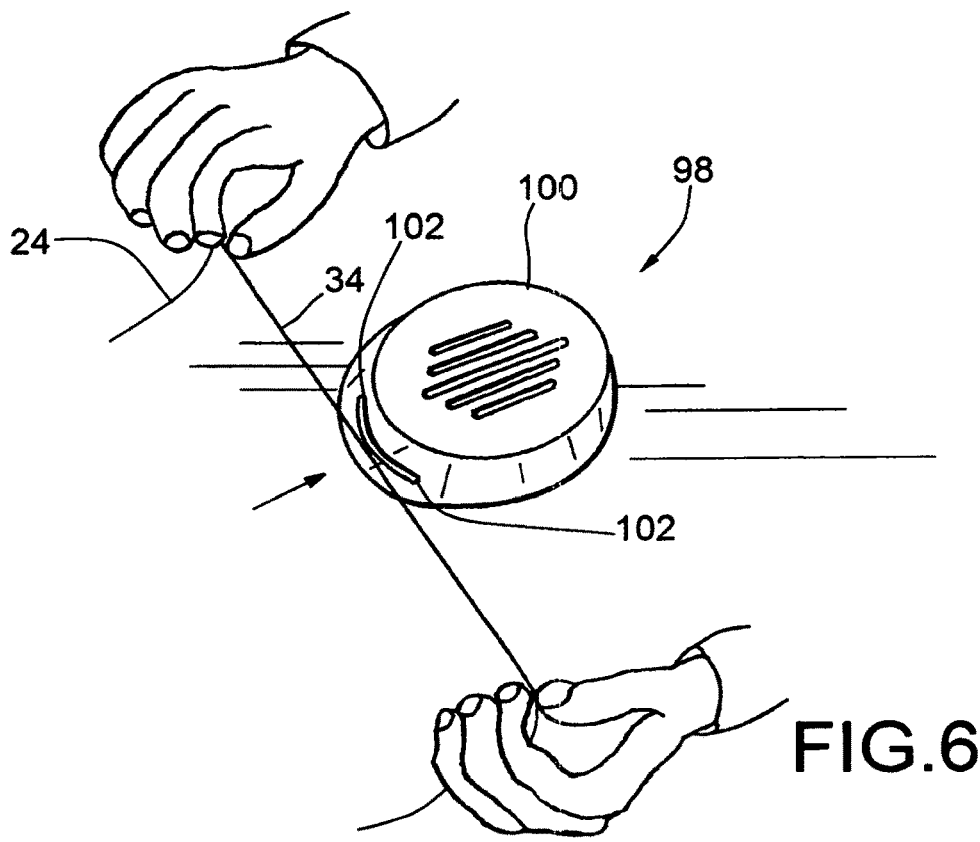
FIG. 6 is a perspective view of another embodiment of the fishing alarm system within which features of the present invention are incorporated shown being readied for use.

It will be understood that numerous modifications and substitutions can be had to the aforedescribed embodiment 20 without departing from the spirit of the invention. For example, although the aforedescribed embodiment 20 has been shown and described as including a casing 40 whose form resembles that of a substantially rectangular prism, the casing of an embodiment incorporating features of the present invention can take an alternative form. For example, there is depicted in FIG. 6 an embodiment, generally indicated 98, having a casing 100 whose form resembles the shape of a relatively short cylindrical prism (or a hockey puck). Such a relatively short form of the embodiment 98 may be preferable over a taller one due to the increased ease with which a shorter casing may be easier to anchor in place (e.g. with stones) than with a taller one. In addition and as does the casing 40 of the embodiment 20 of FIGS. 2-5, the casing 100 of the embodiment 98 of FIG. 6 defines a fishing line-accepting slot 102 in one side thereof into which a fishing line section 34 can be directed sideways therein to a position of rest between opposing contacts for readying the embodiment 98 for use.

With reference to FIGS. 7-9, there is illustrated still another embodiment, generally indicated 200, of a fishing alarm system within which features of the present invention are incorporated. The embodiment 200 includes a rectangular-shaped casing 240 having a slot 238 formed in the exterior walls, indicated 241, of the casing 240 so as to open outwardly of the casing interior, and the casing interior is adapted to house various working components, described herein, of the embodiment 200. More specifically, the hollow interior of the casing 240 houses a single elongated battery 246 fixedly secured therein, and the battery 246 includes positive and negative terminals 270, 272 disposed, respectively, at the upper and lower ends, as viewed in FIG. 7, of the battery 246. The embodiment 200 also includes an electronic alarm-emitting device 242 which is adapted to emit an audible sound, or alarm, when the device 242 is electrically activated.

The alarm-emitting device 242 includes a housing 274 within which known sound-emitting componentry (not shown) is mounted and contacts 278, 280 (in the form of conducting wires) which protrude from the top and bottom, respectively, of the housing 274 of the device 242. When current is permitted to pass between the contacts 278, 280, the device 242 emits an audible alarm capable of being heard by a fisherman located nearby. For purposes of saving battery energy when the embodiment 200 is not in use, the device 242 includes a two-position ON/OFF switch 248 which is accessible to the user through a preformed slot 250 (FIG. 7) formed in the exterior walls 241 of the casing 240 and which is movable relative to the housing 274 between a raised (OFF) position (as illustrated in solid lines in FIG. 7) and a lowered (ON) position (as illustrated in phantom in FIG. 7). When the device is switched to its ON position, electrical current is permitted to pass between the device contacts 278, 280 for activation of the device 242—and thus the generation of an audible alarm. Conversely, when the switch 348 is moved to its OFF position, no electrical current is permitted to pass through the device 242 for the generation of an audible alarm. Thus, the ON/OFF switch 248 enables the device 242 to generate an audible alarm only when the user desires it to do so and thus provides a battery-saving feature for the embodiment 200.

Within the depicted embodiment 200, there is provided a strip 282 of conducting material which is connected between the device contact 280 which protrudes from the underside of the housing 240 and the negative terminal 272 of the battery 246 to permit electrical current to pass between the device contact 280 and the negative terminal 272 of the battery 246. Furthermore, there is also provides a conducting strip 284 which is fixedly joined (e.g. soldered) to the device contact 278 which protrudes from the top of the device housing 274 and extends across the positive terminal 270 of the battery 246. The strip 284 has one end, indicated 285, which is fixedly secured (e.g. soldered) to the (upper) contact 278 of the device 242 and has an opposite, or free, end 287 which protrudes outwardly of the interior of the casing 240 through the preformed slot 238. The free end 287 of the strip 284 is movable relative to the casing 240 between a lowered condition, as depicted in solid lines in FIG. 7 at which the conducting strip 284 is positioned in electrical contact with the positive terminal 270 of the battery 246 and a raised condition, as depicted in phantom in FIG. 7 (and in FIG. 8), at which the strip 284 is positioned out of electrical contact with the battery terminal 270. Preferably, the conducting strip 284 is formed with a degree of inherent resiliency so as to be continually biased (downwardly) into contact with the positive terminal 270 of the battery 246.

The embodiment 200 also includes a secondary strip 290 of conducting material which is secured to the casing so as to extend external of the slot 238 formed therein. If desired, the end of the strip 290 disposed within the casing interior can be provided with an abutment stop 292 against which a section 34 of a fishing line is permitted to rest when urged between the conducting strips 284 and 292 when readying the embodiment 200 for use. As is the case with the previously-described embodiments 20 and 98 of FIGS. 1-6, the embodiment 200 of FIGS. 7-9 is readied for use by manually inserting a section 34 of the fishing line 24 sideways through the casing slot 238 to a position of rest between the strips 284 and 290 (and thus against the abutment stop 292) so that the conducting strip 284 is urged from its FIG. 7 solid line position to its raised, FIG. 7 phantom-line, position (or its position shown in FIG. 8) and thus out of contact with the battery terminal 270 where the section 34 of the fishing line 24 is frictionally held in place between the conducting strips 284 and 290. When the section 34 of fishing line 24 is subsequently dislodged (e.g. rightwardly, as viewed in FIGS. 7 and 8) from its (FIG. 8) position of rest between the strips 284, 292 (as when a fish bites at the hook which is secured to the terminal end of the fishing line 24), the conducting strip 284 is permitted to return into contact with the battery terminal 270 due to the inherent biasing of the strip 284 (downwardly, as viewed in FIGS. 7 and 8) toward the battery terminal 270. It follows that as long as the alarm-emitting device 242 of the embodiment 200 is switched ON, any contact of the conducting strip 284 with the battery terminal 270 completes the electrical circuit through the device 242 so that an alarm is emitted by the device 242. Moreover and in into order to help guide the sideways movement of the section 34 of the fishing line 24 through the preformed slot 238 and into its desired position of rest between the strips 284 and 290 of conductive material, the portions of the strips 284 and 290 which are disposed external of the casing 240 are shaped to provide a guideway 294 having a funnel-shaped mouth 296 which opens away from the slot 238.

It follows that one difference between the embodiment 20 of FIGS. 1-5 and the embodiment 200 of FIGS. 7-9 relates to the involvement of the contacts, or conducting strips, between which the section 34 of fishing line 24 is positioned when the embodiment is readied for use and the electrical circuit is subsequently completed through the alarm-emitting devices of the respective embodiments. In particular and within the embodiment 20 of FIGS. 1-5, both contacts 50 and 52 (FIG. 3) must engage one another for the electrical circuit to be completed in order for an alarm to be emitted from the embodiment 20 whereas within the embodiment 200 of FIGS. 7-9, only the conducting strip 284 (which is engageable with the battery terminal 270) is necessary in order to complete an electrical circuit through the alarm-emitting device 242.

The depicted embodiment 200 can be supported for use adjacent a fishing pole 22 (FIG. 4) in any of a number of ways, but within FIG. 9, there is shown a rod assembly 300 having a plurality of telescoping sections 302, 304 and 306 which can be shifted in position lengthwise with respect to one another in order to adjust the overall length of the assembly 300. Within the depicted rod assembly 300, the lowermost (as viewed in FIG. 9) section 302 has a pointed lower end to facilitate the downward insertion of the assembly 300 into the ground, and the uppermost (as viewed in FIG. 9) section 306 is provided with a pair of brackets 308, 310 between which the casing 240 of the embodiment 200 can be releasably clamped to (or otherwise frictionally held against) the rod section 306. Of course, the embodiment 200 can be releasably secured to the rod assembly 300 in any of a number of alternative ways.

Accordingly, the aforedescribed embodiment 20 is intended for the purpose of illustration and not as limitation.

The invention claimed is:

1. A fishing alarm system for use with a fishing line which moves when disturbed by biting or striking of the fishing line by a fish, the fishing alarm system comprising:
a casing having an interior;
an electronic alarm device mounted within the interior of the casing and adapted to emit an audible sound when an, electrical current is permitted to pass through the electronic alarm device;
an electrical circuit for delivering electrical current to the electronic alarm device and including a battery having a terminal and a first conductive strip of material having a movable portion mounted adjacent the terminal of the battery, and wherein the movable portion of the first conductive strip of material is movable relative to the battery terminal between a lowered position at which the movable portion of the first conductive strip of material engages the battery terminal so that electrical current is permitted to pass between the battery and the electronic alarm device and a raised position at which the movable portion of the first conductive strip of material is out of engagement with the battery terminal so that electrical current is prevented from passing between the battery and the electronic alarm device, and wherein the movable portion is inherently biased from the raised position to the lowered position;
a second strip of material non-movably mounted within the casing and having a stationary portion disposed adjacent said movable portion of the first conductive strip of material so that the stationary portion and the movable portion cooperate to provide an elongated fishing line-accepting guideway having a length and an entrance opening and which permits the insertion of the fishing line directed sideways through the entrance opening and along the length of the fishing line-accepting guideway, and wherein the guideway provides a position of rest therealong at which the movable portion is in the raised position and the fishing line is frictionally held in place between the movable and stationary portions of the first and second strips of material
so that by directing the fishing line sideways along the length of the fishing line-accepting guideway to the position of rest provided therealong, the movable portion is spaced from the battery terminal and so that subsequent removal of the fishing line from the fishing line-accepting guideway, as would occur when the fishing line is disturbed by the biting or striking of the fishing line by the fish, the movable portion is permitted to return to the lowered position so that electrical current is permitted to pass to the electronic alarm device;
and an abutment stop associated with one of the movable and stationary portions of the first and second strips of material for preventing the sideways movement of the fishing line further along the length of the fishing line-accepting guideway from the entrance opening thereof than the position of rest.

2. The fishing alarm system as defined in claim 1, wherein the abutment stop is provided by a protuberance which is formed along the stationary portions of the second strip of material for abutting the fishing line when the fishing line is directed along the fishing line-accepting guideway to the position of rest and thereby preventing further movement of the fishing line along the fishing line-accepting guideway.

3. The fishing alarm system as defined in claim 1, further comprising an ON/OFF switch wired within the electrical circuit enabling a fisherman to switch the system ON and OFF.

4. The fishing alarm system as defined in claim 1 wherein the casing includes exterior walls between which the electrical circuit is housed, and the exterior walls define a slot through which the entrance opening of the fishing line-accepting guideway defined by the movable and stationary portions of the first and second material strips can be accessed with a section of the fishing line.

* * * * *